United States Patent
Lopata et al.

(10) Patent No.: US 6,921,051 B2
(45) Date of Patent: Jul. 26, 2005

(54) SYSTEM FOR THE DELIVERY AND ORBITAL MAINTENANCE OF MICRO SATELLITES AND SMALL SPACE-BASED INSTRUMENTS

(76) Inventors: Jacob B. Lopata, 3413 South Plaza, Apt. A, Santa Ana, CA (US) 92704; Michel R. Kamel, 2201 W. Broadway, Apt. B101, Anaheim, CA (US) 92804

(*) Notice: Subject to any disclaimer, the term of this patent is extended or adjusted under 35 U.S.C. 154(b) by 0 days.

(21) Appl. No.: 10/112,093

(22) Filed: Mar. 27, 2002

(65) Prior Publication Data

US 2002/0171011 A1 Nov. 21, 2002

Related U.S. Application Data

(60) Provisional application No. 60/278,959, filed on Mar. 27, 2001, and provisional application No. 60/278,956, filed on Mar. 27, 2001.

(51) Int. Cl.$^7$ ................................. B64G 1/40
(52) U.S. Cl. ...................................... 244/172
(58) Field of Search ..................... 244/158 R, 164, 244/169, 172

(56) References Cited

U.S. PATENT DOCUMENTS

| | | | |
|---|---|---|---|
| 4,265,416 A | | 5/1981 | Jackson et al. |
| 4,575,029 A | * | 3/1986 | Harwood et al. ........... 244/172 |
| 4,802,639 A | | 2/1989 | Hardy et al. |
| 4,901,949 A | | 2/1990 | Elias |
| 5,186,419 A | | 2/1993 | Scott |
| 5,242,135 A | | 9/1993 | Scott |
| 5,255,873 A | | 10/1993 | Nelson |
| 5,402,965 A | | 4/1995 | Cervisi et al. |
| 5,529,264 A | | 6/1996 | Bedegrew et al. |
| 5,564,648 A | | 10/1996 | Palmer |
| 5,678,784 A | | 10/1997 | Marshall, Jr. et al. |
| 5,740,985 A | | 4/1998 | Scott et al. |
| 5,779,195 A | * | 7/1998 | Basuthakur et al. ........ 244/161 |
| 5,931,419 A | * | 8/1999 | Collyer ................... 244/158 R |
| 5,984,235 A | | 11/1999 | Snowhook |
| 6,029,928 A | | 2/2000 | Kelly |
| 6,068,211 A | | 5/2000 | Toliver et al. |
| 6,446,905 B1 | * | 9/2002 | Campbell et al. ........... 244/172 |

OTHER PUBLICATIONS

"Pegasus Air–Launch System," Orbital Sciences Corporation, http://www.orbital.com/NewsInfo/Publications/Pegasus.pdf, 1997.

"Pegasus," located at http://www.orbital.com/Launch Vehicles/Pegasus/pegasus.htm on Jun. 26, 2002.

"Navy's Air–Launch Satellite Program Starts," Western Avation, Missile and Space Industries, Oct. 1960.

(Continued)

*Primary Examiner*—Galen Barefoot

(57) ABSTRACT

A low cost, on demand, dedicated launch system is provided for placing micro satellites or space-based instruments at orbital and sub-orbital altitudes and velocities. The invention describes a space launch vehicle (SLV) that incorporates a single, integrated guidance, navigation, and control unit (GNCU) that performs all guidance and control for the SLV from main stage ignition to orbital insertion. The GNCU can remain with the payload after orbital insertion to provide satellite station keeping and orbital maneuvering capability. The use of a single integrated avionics unit for all guidance, navigation, and control simplifies the SLV, reducing weight and significantly reducing cost. In addition, this architecture allows for a combined launch and satellite bus system as the GNCU can also be used as a satellite bus. This further reduces cost and increases the payload capacity to orbit by optimizing the use of launch vehicle and satellite bus subsystems and reducing non-instrument mass delivered to orbit. All support functions are provided by the IDMV. This approach represents a significant improvement over conventional systems, especially with respect to the orbital launch of payloads less than about 100 kg.

35 Claims, 3 Drawing Sheets

OTHER PUBLICATIONS

"High Returns, Low Cost Seen in Air–Launched Satellites," Arthur Kranish, Watching Washington, Oct. 1960.

"Navy Space Research Vehicle can be Air–Launched," Emie George, U.S. Naval Ordnance Test Station, China Lake, California, News Release No. 421–B, Oct. 1960.

"Air–Launched Boosters" Spaceflight, vol. 35, Nov. 1993, pp. 363–365.

"Rockets Red Glare," Keith J. Scale, Quest, Spring 1994, pp. 58–61.

"US Navy's Untold Story of Space–Related Firsts," Peter Pesavento, Spaceflight, vol. 38, Jul. 1996.

"NOTSNIK: The Navy's Secret Satellite Program Doing Space, Making it Happen," Spaceviews, vol. Year 1998, Issue 7, Jul. 1998, http://www.spaceviews.com/1998/07 located at http://www.seds.org.pub/info/newsletter/spaceviews9807.txt on Jun. 26, 2002.

"Technology Applications," China Lake Weapons Digest, located at http://www.nawcwpns.navy.mil/clmf/weap-dig.html on Jun. 27, 2002.

* cited by examiner

SYSTEM FOR THE DELIVERY AND ORBITAL MAINTENANCE OF MICRO SATELLITES AND SMALL SPACE-BASED INSTRUMENTS

REFERENCE TO RELATED APPLICATIONS

This application claims priority under 35 U.S.C. §119(e) from U.S. Provisional Application No. 60/278,959, filed Mar. 27, 2001, entitled "INTEGRATED SYSTEM FOR THE DELIVERY AND MAINTENANCE OF SPACE-BASED INSTRUMENTS" and from U.S. Provisional Application No. 60/278,956, filed Mar. 27, 2001, entitled "LAUNCH SYSTEM FOR MICRO SATELLITES".

BACKGROUND OF THE INVENTION

1. Field of the Invention

This invention relates to a launch system for satellites or other payloads. More specifically, this invention relates to an integrated system for controlling both the launch and orbital operation of a payload.

2. Description of the Related Art

Dozens of government and commercial research organizations worldwide design and build micro satellites (complete, independent systems less than 100 kg) and small instruments that desire on-demand access to space. However, these organizations are not able to get to orbit because access to space is either not affordable or unavailable. Customers of this emerging space market include military organizations, the armed forces, entrepreneurs, major corporations, universities, research institutions, and space products companies that want to do space science or on orbit technology demonstrations. Micro satellites, small instruments, and other small payloads, are desirable because they can be built in large numbers for very low cost. However, the ability to build these small, low cost payloads in large numbers is not an advantage if they cannot reach orbit. This problem has been identified as a major roadblock to the development of new small payload missions.

Given the current high cost of dedicated space launch, small payloads are limited to launch opportunities that involve available excess launch mass on larger launch vehicles. Another option is to manifest multiple small payloads on a single large launch vehicle or satellite bus thereby spreading the launch cost out among several customers. In either case, significant hurdles exist to obtaining such a launch and when a launch slot is available it may not meet the exact needs of the payload operator. The difficulties in securing a low cost launch opportunity that meets both schedule and mission requirements often leads to many small payloads never reaching orbit and provides a disincentive for the planning of new missions.

Many aspects of the access to space problem, as they relate to micro satellites and other small payloads, can be addressed through a low cost, dedicated launch service. However, as the size of launch vehicles decrease they typically become more expensive per unit of payload weight putting dedicated launch services outside the reach of most small payload customers. These customers can typically not afford to pay more than $2 million per launch. As a result, no dedicated orbital launch system is currently in operation for payloads less than 100 kg. The smallest dedicated launch system that is currently in operation is the Pegasus air-launch vehicle, which can place up to 450 kg in to low-Earth orbit for $15–20 million.

Therefore, there is a continued need for systems that enable effective and efficient delivery of small payloads to space.

SUMMARY OF THE INVENTION

For purposes of summarizing, certain aspects, advantages and novel features have been described herein. It is to be understood that not necessarily all such advantages may be achieved in accordance with any particular embodiment. Thus, the systems described may be embodied or carried out in a manner that achieves or optimizes one advantage or group of advantages as taught herein without necessarily achieving other advantages as may be taught or suggested herein.

One aspect of a system described herein is a system for launching payloads into orbital trajectories whereby all guidance and control functions during ascent to orbit, including all thrusters for pitch, yaw and roll, are located in a single unit. This significantly reduces primary boost propulsion costs by simplifying said boost motors as nozzle gimballing for thrust vector control is not required. This technique may also provide for a reduction in the total mission cost by eliminating systems that perform the same function for the launch vehicle and the instrument being launched but would normally operate independently and at different times.

Another aspect of the system involves integrating the space vehicle with the payload such that the control unit that handles the functions of a launch vehicle may also be used to control and maintain the payload once the payload is on orbit.

The present invention describes a system that combines the functions of the satellite and the launch vehicle, thereby significantly reducing the cost of launching space-based instruments.

BRIEF DESCRIPTION OF THE DRAWINGS

The above mentioned and other features of the system will now be described with reference to the drawings of preferred embodiments. The embodiments shown are intended to illustrate, but not to limit the invention. The drawings contain the following figures.

DETAILED DESCRIPTION OF THE PREFERRED EMBODIMENTS

The following description and examples illustrate in detail preferred embodiments of system and techniques for providing more efficient and effective launch and on orbit maintenance of satellites or other payloads. One aspect of this system involves integrating systems that perform the same or similar functions during the launch and on orbit phases of a mission. These systems and techniques are disclosed in the context of use with exemplary payloads. However, the principles of this system and the methods of use associated with it are not limited to any particular payload. It will be understood by those of skill in the art in view of the present disclosure that the system described herein may be applied to a variety of different payloads and satellites other than those that are described herein.

Overview

In order to place a satellite or other payload into a particular orbit or trajectory (e.g., a low-earth orbit, a geo-synchronous orbit, or a ballistic trajectory) a launch vehicle system may be used. The payload is mounted upon the launch system, and the launch system is used to accelerate the payload to the required position and velocity in order for it to follow the desired trajectory. Once this trajectory is achieved, the payload is generally separated from the launch vehicle. One launch system comprises a multi-stage rocket system to which a satellite or other payload is attached. Such rockets may be launched from ground-based platforms, sea-based platforms, or air-based platforms. Because the payload and launch vehicle systems are generally separate units that are only connected at the launch site prior to launch, the design of the launch vehicle system and satellite are generally carried out independently by separate organizations.

Figure 1:
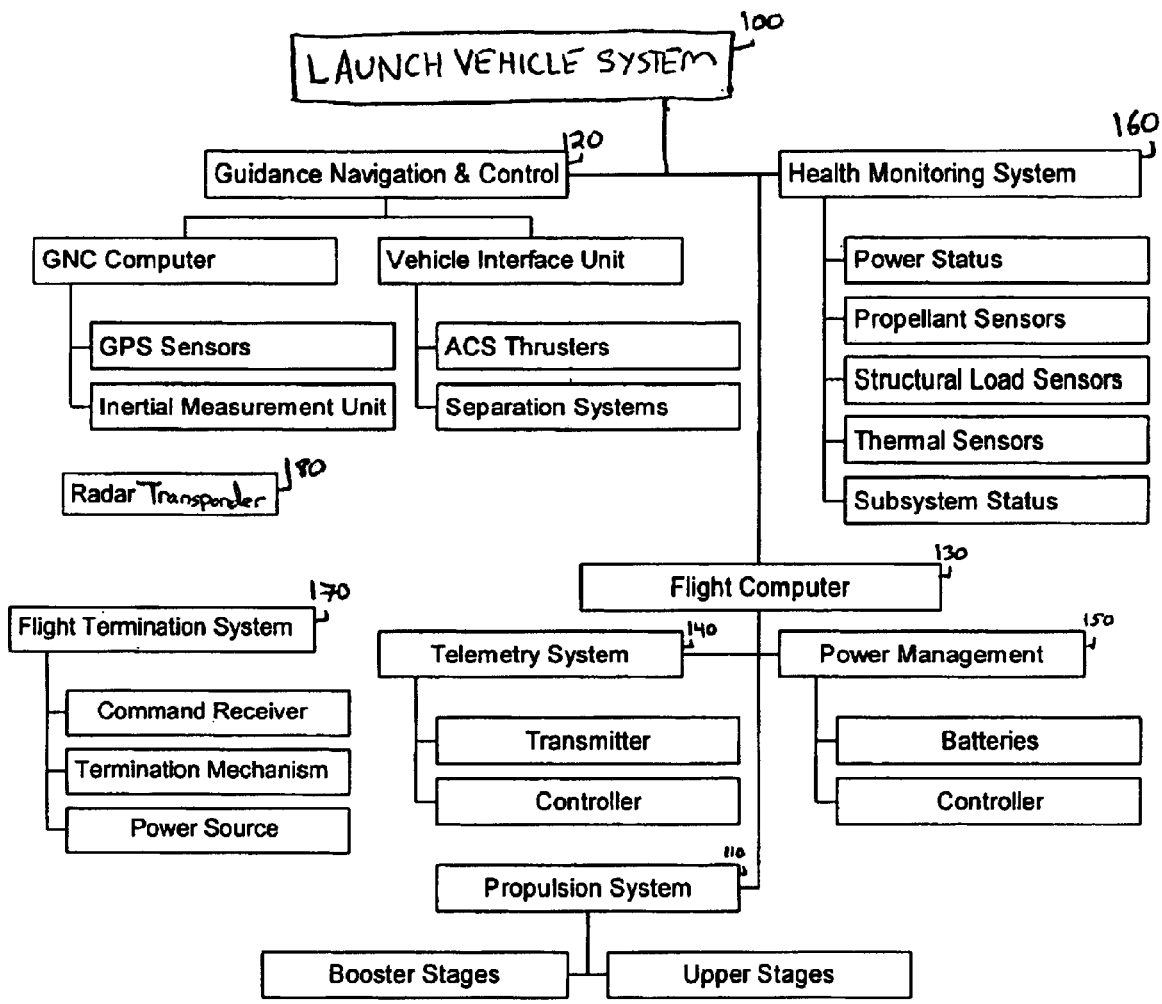
FIG. 1 illustrates a schematic diagram of a conventional launch vehicle's system architecture.

FIG. 1 is a schematic representation of the architecture of a such a conventional launch vehicle system 100. The launch vehicle system 100 comprises a number of sub-systems, including: a propulsion system 110, a guidance, navigation and control (GNC) system 120, a flight computer 130, a telemetry system 140, a power management system 150, and a health monitoring system 160. Launch vehicles typically also have an independent flight termination system 170 that gives ground controllers the ability to destroy the vehicle upon command if necessary, and a radar transponder 180 to enhance the radar signature of the vehicle during ascent.

The launch vehicle system 100 is used to place the satellite or other payload into the required trajectory through the appropriate firing of the propulsion system 110. This may include sequential firing of multiple stages of rocket motors that are discarded after use. Once the launch vehicle system has achieved its purpose of placing the payload into the proper trajectory, the launch vehicle 100 and its sub-systems are deactivated. There is typically no direct interface between the launch vehicle 100 and the payload.

Figure 2:
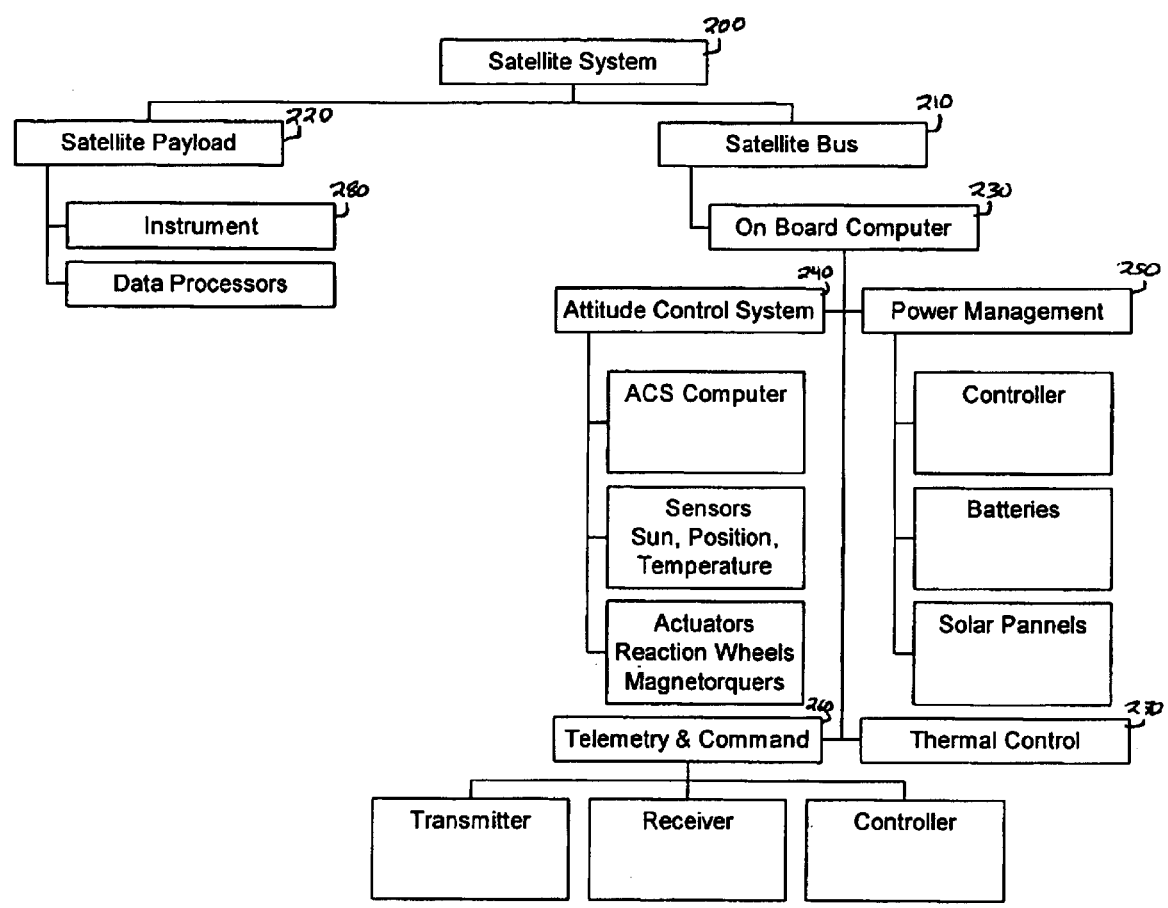
FIG. 2 illustrates a schematic diagram of a conventional satellite's system architecture.

FIG. 2 is a schematic representation of the architecture of a satellite system 200 such as might be used with the launch vehicle system 100 described above and shown in FIG. 1. The satellite system 200 comprises generally a satellite bus 210 and a payload 220. The satellite bus 210 is typically a mechanical structure with radiation-hardened electronics comprising an onboard computer 230, an attitude control system 240, a power management system 250, a tracking, telemetry and command system 260 and a thermal control system 270. The satellite bus 210 typically provides power to the instrument 280 or other payload and allows for the transfer of data to and from the instrument 280 during its operational lifetime.

The satellite bus is generally not active during the launch phase and often is only activated once the satellite system 200 has been deployed into the proper trajectory. The launch vehicle system 100 and the satellite system 200 operate independently of each other and do not generally share any resources.

This independence of the launch vehicle and the satellite system has traditionally been used for launch of space-based instruments and other payloads. Even though many functions provided by the sub-systems within the launch vehicle system 100 are duplicated by the sub-systems within the satellite system 200, separate sub-systems are carried by the launch vehicle 100 and the satellite 200 for these purposes. In order to improve the efficiency of the overall launch vehicle and satellite systems, it may be desirable to combine certain functions and features of the launch vehicle with those of the satellite system. By integrating these functions and features, redundant systems may be eliminated, resulting in cost and weight savings.

Guidance, Navigation and Control Unit (GNCU)

In one preferred embodiment, a low cost, dedicated launch system is provided for placing small payloads at orbital and sub-orbital altitudes and velocities. This system comprises a space launch vehicle (SLV), with a guidance, navigation and control unit (GNCU), and a payload. Such a system as the GNCU may be used with the launch vehicle system 100 as described above. The SLV may comprise a multi-stage, expendable rocket propelled vehicle, such as an air-launched system. The GNCU desirably performs guidance and control for the SLV throughout the launch phase of the mission up to and including the insertion of the payload into the desired trajectory. The GNCU may also remain with the payload after orbital insertion to provide satellite station keeping and orbital maneuvering capability while on orbit.

In a preferred embodiment of the GNCU, all guidance and control functions during ascent to orbit, including all thrusters for pitch, yaw and roll, may be located in a single unit. This simplifies the SLV, reducing its weight and also reducing the cost of the SLV. These effects are most pronounced for small, air-launched rockets.

In a preferred embodiment, the GNCU may typically be positioned between the final boost stage motor and a satellite or other payload. The GNCU may provide command and control, via head-end steering, for the SLV from launch through burnout of the final boost stage. The GNCU may remain with the satellite after the burnout of the final boost stage and provide command and control for the payload up to insertion into the desired trajectory, thereby increasing orbital insertion accuracy.

In this embodiment, the GNCU houses the avionics sub-systems, which include a flight computer and its associated software, a position and attitude determination system, such as an inertial measurement unit/global positioning system (IMU/GPS), batteries, telemetry transmitters and the attitude control system. The attitude control system (ACS) desirably includes reaction control thrusters, which can provide pitch, roll, and yaw control through third stage burnout. These thrusters may comprise monopropellant, bi-propellant, or hybrid thrusters.

The ACS may also provide orbital injection corrections, velocity trim and orbit circularizing maneuvers for the payload. In this case the GNCU performs the final orbit injection burns and any needed corrections to place the payload into the precise desired orbit. In alternative embodiments, a combination of active attitude control using thrusters and spin stabilization can be used to minimize the amount of ACS propellant required during ascent to orbit.

SLV Launch

In one preferred embodiment, the SLV is air launched at a predetermined altitude and velocity by a winged reusable vehicle. This reusable winged vehicle can be, but is not limited to, a military type turbojet or turbofan powered aircraft. This reusable vehicle may be piloted directly by a human operator or may be flown remotely. Typically, the SLV is carried beneath or within said reusable vehicle. For instance, the SLV may be carried underneath the fuselage or wing of the reusable vehicle. The reusable vehicle carries the SLV to a predetermined altitude, latitude and longitude for deployment. Typically, this altitude is less than about 25 km, however in certain embodiments greater altitudes may be preferred.

Once the appropriate altitude, latitude and longitude for deployment are reached, the reusable vehicle preferably accelerates to a target speed typically at or above the speed of sound. This acceleration to the target speed may be enhanced by way of a shallow dive. Once the target speed is reached, the reusable vehicle initiates a high G pull-up. Preferably, a 2-G or greater pull-up is performed. During the pull-up, at a predetermined attitude, or deck angle, the reusable vehicle releases the SLV in an "air toss" maneuver. The deck angle is defined broadly as the acute angle between the centerline of the SLV or reusable vehicle and a line parallel to the surface of the Earth. Via this air toss, the momentum imparted to the SLV by the reusable vehicle carries the SLV away from the reusable vehicle along a trajectory that increases the altitude of the SLV and maintains a deck angle between approximately 45° and 55° for the SLV.

After the release of the SLV from the reusable vehicle, the rocket motors of the SLV are ignited and the launch phase of the mission is initiated. By releasing the SLV at a high deck angle prior to the ignition of the SLV motors, the weight and complexity of the SLV may be minimized since large aerodynamic lifting surfaces are not required to change the initial velocity vector of the SLV. This benefit is not achieved for systems where a horizontal deployment is accomplished, such as those described in U.S. Pat. No. 4,901,949 and U.S. Pat. No. 5,402,965.

After a predetermined amount of time from release of the SLV from the reusable vehicle, the first stage of the SLV is ignited. This time may desirably be selected in order to provide a safe separation between the SLV and the reusable vehicle. After first stage ignition, the SLV is accelerated and guided along a predetermined path in several stages by the rocket motors of the SLV. Typically, two or three boost stages are utilized to accelerate the SLV to orbital velocity using such techniques as are known in the art of multi-stage rockets.

The main rocket stages of the SLV are preferably solid propellant or hybrid motors including the necessary structural elements and preferably a single fixed nozzle. The main rocket stages are preferably connected through interstages. The interstages can be independent structures that allow for the attachment of one main stage to another by way of releasable bolts or clamps. When a given rocket stage has been expended or is nearly expended, a command is sent to the mechanism connecting that stage to the interstage which releases the spent stage from the remainder of the SLV.

A payload shroud or heat shield may be employed to protect the payload while the SLV is operating within the atmosphere. The payload shroud is preferably split axially and includes two parts which when placed together completely enclose and protect the payload. If the SLV is carried within the aircraft and deployed exo-atmospherically, it may be desirable to not use a payload shroud.

The ability to incorporate the GNCU results from the relatively small size of the SLV, compared to equivalent ground launch systems, and the SLV's initial launch conditions. The air-launch technique contributes the to ability to use a small SLV. Air launching a rocket at high altitude and velocity results in a smaller vehicle for two main reasons. First, the potential and kinetic energy imparted to the SLV by the carrier aircraft reduce the amount of SLV propellant required to reach orbit. Second, additional propellant may be saved due to a reduction in gravity and drag losses, which are reduced by not using the SLV for propulsion in the lower atmosphere (i.e., the liftoff from the ground).

In addition to the small size of the SLV, the initial launch conditions of the SLV are such that less command authority may be required to maintain proper attitude and directional control during the launch phase of the mission than would be needed for a ground launch. A consequence of both these conditions may be that all trajectory steering can be accomplished from a single location. In such a system, no active guidance control mechanisms of any kind (i.e., thrust vectoring systems) are required on any of the main stages. By eliminating the need for thrust vectoring systems, the heavy and expensive gimbal mounting systems typically used to accomplish such thrust vectoring may be eliminated. By eliminating such mechanisms, the expense of producing the SLV may be reduced, and an overall lighter SLV may be used as the weight of the gimbal mechanisms themselves need not be carried.

Variations

As discussed above, it is not necessary for the primary boost stages to have independent attitude control systems. The attitude and directional control of the SLV may be provided by the reaction control thrusters of the ACS of the GNCU at the head end of the SLV. This "head-end steering" technique is made possible by the small overall size of the SLV and the correspondingly small control forces and torques which are required to properly orient this smaller vehicle.

However, in an alternate embodiment of the SLV, the various stages of the SLV may include additional propellant tanks for storage of propellant used for attitude and directional control by the ACS. The propellant in these tanks may be fed to the GNCU reaction control thrusters. In this way, the storage of reaction control propellant may be associated with the boost stages that will require the usage of that propellant. In this way, the overall size of the propellant storage tanks of the GNCU itself may be minimized so as to allow for a smaller GNCU unit and on orbit device.

In the case of hybrid boost motors, propellant for the GNCU reaction control thrusters can be fed directly from the boost motor's main oxidizer tank. By using the same oxidizer tank that is being shared with the boost motor for the particular stage of the SLV, the number of additional ACS propellant tanks may be reduced.

In these alternate embodiments which place additional propellant for the ACS in the boost stages, it is desirable to connect these tanks to the reaction control thrusters of the GNCU. In order to draw propellant for the reaction control thrusters from the boost stage tanks, plumbing may be run between the reaction control thrusters and these tanks, the plumbing running through the interstages.

As discussed above, the interstages are structural elements that transmit loads and releasably connect the individual boost stages of the SLV to each other. An interstage may also be used to connect the final boost stage to the GNCU. The plumbing that feeds through the interstages may utilize breakaway or quick disconnect fittings. When a particular stage is expended and separated from the appropriate interstage, these fittings on the feed-through plumbing separate and the fluid lines are automatically sealed on both ends.

Instrument Delivery and Maintenance Vehicle (IDMV)

Figure 3:
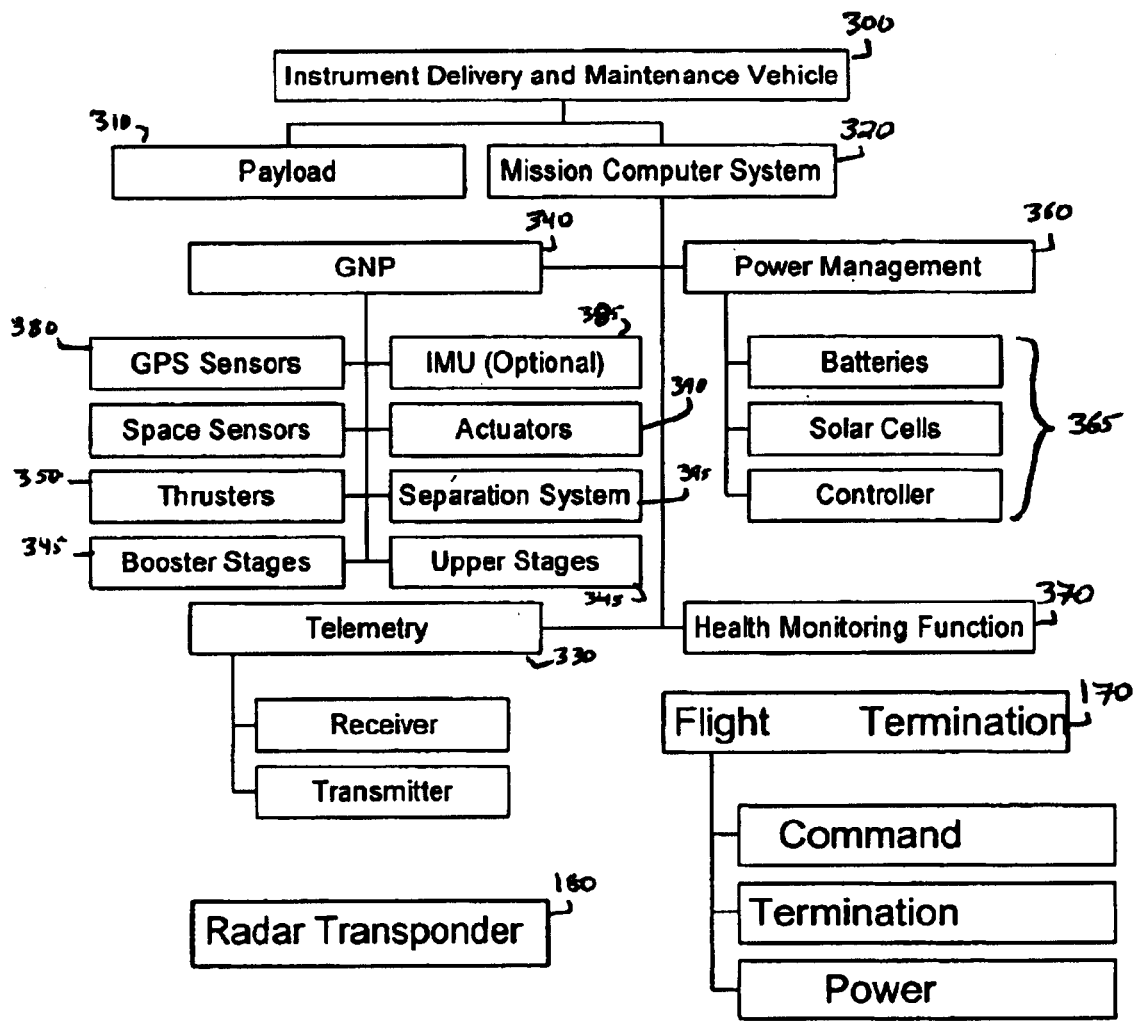
FIG. 3 illustrates a schematic diagram of an integrated delivery and maintenance vehicle architecture according to one preferred embodiment described herein.

FIG. 3 is an illustration of one embodiment of an IDMV system architecture. The system is adaptable to any launch vehicle or satellite bus class, but is especially beneficial for payloads less than 100 kg. Launch vehicles and satellite buses are classified according to the payload (e.g., satellite) mass delivered to the desired trajectory. Nano satellites are those satellites between 1 kg and 10 kg. Micro satellites are those satellites between 10 kg and 100 kg. Mini satellites have an on orbit mass between 100 kg and 500 kg. Medium satellites are between 500 kg and 1000 kg, and large satellites are those satellites with a mass greater than 1000 kg.

In another preferred embodiment, the SLV and GNCU can be adapted to provide the necessary acceleration, attitude control, guidance, navigation, telemetry, power management and orbital maneuvering functions needed in order to place and maintain an instrument, as opposed to a complete satellite, at a particular orbital altitude and velocity. This embodiment is referred to as an instrument delivery and maintenance vehicle (IDMV). The IDMV combines the functions of the satellite bus and GNCU and incorporates propulsion systems similar to the aforementioned SLV.

In addition, the IDMV architecture preferably allows for a combined launch and satellite bus system, since the GNCU can also be used as a satellite bus. This may further reduce the cost and increase the payload capacity to orbit of the launch system by optimizing the use of the launch vehicle and satellite subsystems and reducing non-instrument mass (e.g., redundant systems), which is accelerated during the delivery of the instrument to orbit at great expense. In this embodiment, the mission specific instrument for use on orbit is simply connected to the IDMV, which handles all support functions for the instrument as well as the launch phase of the mission. This approach represents a significant improvement over conventional systems, such as those shown in FIGS. 1 and 2, especially with respect to the orbital launch of payloads less than about 100 kg.

As shown in FIG. 3, the IDMV 300 comprises an integrated system that includes the features and functions of the satellite bus as well as the control systems for the launch vehicle. By combining all of these features into a single unit, a space-based instrument may be attached directly to the IDMV 300. In this way all mission functions may be carried out using the IDMV without the separate systems normally utilized independently for the launch vehicle and the satellite.

Although the IDMV may comprise a completely new vehicle unrelated to any existing launch vehicle system in one embodiment, it may be advantageous to convert a conventional launch vehicle system (such as that represented in FIG. 1) into an IDMV in an alternate embodiment. Such a conversion may preferably be accomplished by removing the GNC computer, global positioning system (GPS) sensors, inertial measurement unit, flight computer 130, telemetry system 140, and the power management system 150 from a conventional launch vehicle system 100. A GNCU or suitable satellite bus may then be incorporated into the launch vehicle system that provides the necessary subsystems to perform the functions of the aforementioned removed systems. Said functions are those required to accelerate the instrument to orbital velocity in addition to those required to support the instrument during the on orbit life of the instrument.

The resulting architecture of the IDMV 300 as shown in FIG. 3 may preferably incorporate a single mission computer system (MCS) 320 that controls all the functions previously controlled by the separate launch vehicle flight computer 130 and the satellite on board computer 230. The MCS 230 will handle control of the various subsystems that were previously under the control and direction of the flight computer 130 or on board computer 230.

In a preferred embodiment, a single MCS 230 handles all the necessary command and data handling functions from launch to insertion of the instrument into the final orbit and during the operational lifetime of the instrument or other payload 310. A single telemetry system 330 is used for data transfer between the IDMV 300 and ground stations during the ascent and orbital maneuvering phases of the mission prior to reaching the desired final orbit. The single telemetry system 330, controlled by the MCS 320, is also used for data transfer to and from the instrument for the duration of the instrument's operational lifetime. A guidance, navigation, and propulsion (GNP) 340 system is used to accelerate the IDMV 300 to orbital velocity, maintain the proper trajectory during ascent and, while on orbit, to conduct all orbit maintenance maneuvers for the instrument during its operational lifetime.

The GNP 340 typically incorporates multiple expendable boost stages 345 that comprise separate boost motors that are expended as the IDMV 300 ascends to orbit. The boost motors are typically simple solid or hybrid motors with single fixed nozzles. The GNP typically also incorporates a secondary propulsion system analogous to the ACS of the GNCU of the prior embodiment. The secondary propulsion system may comprise thrusters 350 that can provide for yaw, pitch, and roll control during ascent and station keeping for the instrument while on orbit. The secondary propulsion system 350 will typically incorporate monopropellant, bi-propellant, or hybrid thrusters. The GNP 340 and telemetry systems 330 may utilize conventional components but may also comprise unique systems specially adapted for use as part of an IDMV 300 as disclosed herein. Such systems may be hybrids of the separate systems from the launch vehicle system and satellite system that they are replacing.

For instance, the GNP sub-system may comprise, but is not limited to, one or more launch propulsion stages 345, auxiliary propulsion system thrusters 350, stage separation systems 375, propellant tanks, GPS sensors 380, inertial measurement units 385 or other position and attitude sensors and actuators 390.

The MCS 320 is used for all data processing functions required by the GNP system 340. A single power management system 360 controls the charging and discharging of the IDMV power sources during ascent, while on orbit, and during the operational lifetime of the instrument. The MCS 320 performs the vehicle health monitoring function 370 during ascent and on orbit during the operational lifetime of the instrument.

Unlike systems in which there are separate command and control computers for the launch vehicle and the satellite bus (see FIGS. 1 and 2), the MCS allows a single system to perform the appropriate command and control functions for both the launch and on orbit operational phases of the mission. Furthermore, unlike in the conventional systems shown in FIGS. 1 and 2, the MCS 320 provides command, control and data processing for the various subsystems that support the IDMV 300.

As shown in FIG. 3, the IDMV 300 may comprise an MCS 320, a GNP system 340, a power management system 360, a telemetry system 330, and a health monitoring function 370. In addition, the IDMV 300 may further comprise an independent flight termination system 170 and an independent radar transponder 180. The same flight termination system 170 and radar transponder 180 systems as are used in conventional launch vehicle systems and satellite systems may be used in the IDMV as these functions need not be tied into the operation of the remainder of the system.

The instrument or other payload 310 may be delivered to a system integration facility prior to launch to be integrated with the IDMV 300. The instrument and the IDMV may desirably utilize a standardized interface that allows for "plug and play" installation. Such interfaces may include, but are not limited to: USB, Firewire, ethernet, RS-232 or other serial interfaces, coaxial connectors, edge connectors, or such other mechanical interfaces and protocols as are known to those of skill in the art.

The payload 310 may comprise any combination of electronic, electrical, mechanical or optical devices that are to be delivered to a pre-determined orbit and which may desirably remain in space for a period of time. Example payloads suitable for launch using an IDMV may include devices intended for, but not limited to: earth imaging, telecommunications, earth sensing, space sensing, deep space flight, radar missions, research and testing, position sensing, on-orbit processing, and such other purposes as may be known to those of skill in the art.

The instrument or other payload 310 may be mounted to an adapter that provides power and data interconnections between the instrument and the IDMV. The payload 310 may receive power from the power management system 360 of the IDMV 300 as necessary. Similarly, the payload may transmit any desired data to ground stations or other receivers via the telemetry system 330 of the IDMV 300. By sharing these sub-systems of the IDMV 300, a further reduction in the infrastructure incorporated into the payload may be achieved.

After initiating the launch phase of the mission, the MCS 320 processes the flight data gathered during the ascent of the IDMV 300 and supports the data processing functions of the GNP system 340 that are required to maintain the IDMV 300 its proper predetermined launch trajectory. The MCS 320 interfaces with the propulsion stages 345 and the stage separation systems 375 to initiate and/or terminate stage propulsion and initiate stage separation. Individual valves, thrusters, propellant tanks and other devices that are part of the GNP system 340 can be mounted at different locations in the IDMV 300 and dispensed of during ascent or on orbit as desired. The MCS 320 also controls the telemetry system 330 for the transfer of data to and from ground stations or other receivers during ascent. Individual batteries or other power sources 365 may be attached to the separate stages or installed in the interstages and discarded during the ascent phase or once on orbit. The MCS 320 may be used to control the power management for the batteries and other power systems 365 used in the IDMV 300. In particular embodiments, it may be desirable that the batteries or other power sources used for operating the flight termination system 170 are not under the control of the MCS 320.

The MCS 320 desirably incorporates memory sufficient to store the required flight and system software. In a preferred embodiment, multiple commercial-off-the-shelf (COTS) computer processors are used in place of a single specialized radiation hardened processor to decrease cost and increase system reliability. Two or three COTS processors may be used which provide identical redundant functions for the MCS. These backup processors comprise secondary mission computer systems and are desirably equipped with inputs that duplicate those of the main MCS 320. In this way, if the main MCS 320 is to fail, either backup system can take over and complete the mission.

Through the use of the systems and techniques described herein, an increase in the payload capacity of a given launch vehicle may be achieved by reducing the total inert mass of said launch vehicle at lift off. Conventionally, the inert mass at lift off includes the mass of the launch vehicle's sub-systems, as well as those of the satellite bus. In many cases these systems perform many similar functions. By integrating these systems and sub-systems, as described herein, this redundancy may be reduced, and a single system may provide the appropriate functions normally provided by the systems of the launch vehicle and the satellite bus. In this way, the IDMV may be made less complex, less expensive, and more efficient than a system utilizing separate launch and satellite systems and buses.

The benefits realized by using the systems described herein are generally more pronounced for the smaller classes of launch vehicles and payloads. For smaller launch vehicles, specifically those vehicles with a launch capacity of less than 100 kg to low-Earth-orbit, integrating the functions of the launch vehicle and the satellite bus into one system as described herein can increase the payload capacity by more than 100% while reducing hardware and operational costs.

All references and descriptions in this application relate to the preferred embodiments described and supported herein, notwithstanding the fact that the context may seem to refer to the subject invention in general. The various embodiments of launching systems and their control systems described above thus provide a number of ways to provide an efficient and low cost system for launching small payloads. In addition, the techniques described may be broadly applied across a variety of payloads, and may be used with designs making use of different launch systems.

Of course, it is to be understood that not necessarily all such objectives or advantages may be achieved in accordance with any particular embodiment using the systems described herein. Thus, for example, those skilled in the art will recognize that the systems may be developed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments. Although these techniques and systems have been disclosed in the context of certain embodiments and examples, it will be understood by those skilled in the art that these techniques and systems may be extended beyond the specifically disclosed embodiments to other alternative embodiments and/or uses and obvious modifications and equivalents thereof. Thus, it is intended that the scope of the systems disclosed herein disclosed should not be limited by the particular disclosed embodiments described above, but should be determined only by the scope of the claims that follow.

What is claimed is:

1. A launch system for placing a payload in orbit, the launch system comprising: an air-launched space vehicle, wherein the space vehicle is integrated with a payload and including a means for head-end steering, wherein the space vehicle is deployed from a reusable winged vehicle.

2. The launch system of claim 1, wherein the reusable winged vehicle is a turbo-jet powered aircraft.

3. The launch system of claim 1, wherein the payload has a weight of less than about 100 kg.

4. The launch system of claim 1, wherein the space vehicle further comprises an expendable, multi-stage, wingless, rocket powered vehicle.

5. The launch system of claim 1, wherein the space vehicle further comprises a means of accelerating the space vehicle to orbital velocity and a means for guiding the space vehicle from the point of deployment to a destination in Earth orbit.

6. The launch system of claim 1, wherein the space vehicle further comprises a means for guiding the space vehicle from the point of deployment to a destination in Earth orbit.

7. The launch system of claim 6, wherein the point of deployment is at an altitude less than about 12 km.

8. The launch system of claim 6, wherein the point of deployment is at an altitude less than about 25 km.

9. A system for placing a payload at orbital or sub-orbital trajectories, the system comprising a launch system and satellite bus system including a guidance, navigation and control unit (GNCU), wherein the launch system and satellite bus system are integrated, and wherein said launch system and satellite bus system are controlled by a single mission computer system and maneuvered by a head-end steering means disposed on the GNCU.

10. The system of claim 9, wherein the launch system and satellite bus are operated using a single telemetry system.

11. The system of claim 9, wherein the launch system and satellite bus are operated using a single guidance, navigation and propulsion system.

12. The system of claim 9, wherein the payload has a weight of less than about 100 kg.

13. The system of claim 9, wherein the payload comprises an instrument.

14. A launch system for placing a payload into a desired trajectory about the Earth, the launch system comprising: a payload configured to o perate in a trajectory about the Earth; a launch vehicle configured to deliver the payload into the trajectory about the Earth; a guidance, navigation and control unit including a means for head-end steering for maneuvering the launch vehicle; and a guidance unit, wherein the guidance unit is configured to control the delivery of the payload by the launch vehicle and is further configured to monitor and control the operation of the payload on orbit.

15. The launch system of claim 14 wherein the payload comprises a satellite.

16. The launch system of claim 14 wherein the payload comprises an instrument.

17. The launch system of claim 14 wherein the guidance unit comprises a mission computer system.

18. A space launch vehicle (SLV) or placing payloads in earth orbit, comprising:
    rocket means for providing propulsion to said SLV;
    payload means coupled to said rocket means, said payload means having a mass of less then approximately 100 kilograms, said payload means being adapted to perform functions after being placed in orbit;
    a single guidance, navigation and control unit (GNCU) means for controlling the operation of said rocket means and said payload means comprising:
        an attitude control means for maneuvering said SLV while said SLV is operating in a launch phase.

19. The device of claim 18 wherein said payload means comprises a satellite.

20. The device of claim 18 wherein said GNCU means is integrated with said payload and is adapted to perform guidance and control of the SLV through a launch phase and a maneuvering phase into a desired trajectory.

21. The device of claim 18 wherein said rocket means includes a nozzle, said nozzle being fixed in a single position.

22. The device of claim 18 wherein said rocket means comprises a plurality of stages, each stage having a nozzle in a fixed position.

23. The device of claim 18 wherein said GNCU includes attitude control means for pitch, roll and yaw control.

24. The device of claim 18 wherein said GNCU includes reaction control thrusters for spinning said SLV about a central axis.

25. The device of claim 18 wherein said rocket means includes a propellant tank, and plumbing is coupled between said propellant tank and said GNCU such that said GNCU may draw propellant from said propellant tank for use in maneuvering said SLV.

26. A method for launching a space launch vehicle (SLV), comprising the steps of:
    attaching said SLV to a winged reusable vehicle, said SLV including a payload;
    flying said winged reusable vehicle at a predetermined altitude;
    causing said winged reusable vehicle to perform a pull-up maneuver until a desired attitude is reached;
    releasing said SLV after said desired attitude is reached;
    maneuvering said SLV while in flight using a means or head end steering.

27. The method of claim 26, further comprising, after said releasing step, the step of rotating said space launch vehicle about a central axis.

28. The method of claim 26, wherein said desired attitude constitutes said reusable winged vehicle being in a climb with a deck angle of a approximately 45° to 55°.

29. A method for launching a space launch vehicle (SLV), comprising the steps of:
    attaching said SLV to a winged reusable vehicle, said SLV including at least a rocket means having at least one stage and a means for head end steering, where said at least one stage further includes a nozzle in a fixed position;
    flying said winged reusable vehicle at a predetermined altitude;
    causing said winged reusable vehicle to perform a pull-up maneuver until it is climbing at a deck angle of approximately 45°–55°;
    releasing said SLV after said desired attitude is reached;
    spinning said SLV about a central axis; and
    maneuvering said SLV while in flight using said means for head end steering.

30. The method of claim 29 wherein said SLV further includes a payload, and wherein a single guidance, navigation and control unit control the operation of said SLV and said payload.

31. The method of claim 30, wherein said payload comprises a satellite.

32. The method of claim 30 where said payload comprises an instrument.

33. An instrument delivery and maintenance vehicle (IDMV), comprising:
    a guidance, navigation and propulsion (GNP) means for providing propulsion to said IDMV and controlling the operation of said IDMV and provides for head end steering for maneuvering said IDMV in a launch phase;
    an instrument coupled to said GNP, said instrument intended to be placed in a desired trajectory;
    wherein said GNP further controls the operation of said instrument.

34. The device of claim 33 wherein said GNP comprise a guidance navigation and control unit and a rocket means having at least one stage.

35. An instrument delivery and maintenance vehicle (IDMV), comprising:
    an instrument intended to be placed in a desired trajectory;
    a guidance, navigation and propulsion (GNP) means coupled to said instrument, said GNP including:
        rocket means having at least one stage for providing propulsion to said IDMV;
        a guidance navigation and control unit for controlling the operation of said IDMV;
        and wherein said IDMV further comprises a means for head end steering for maneuvering said IDMV in a launch phase.

* * * * *